(12) United States Patent
Badman

(10) Patent No.: US 8,633,389 B2
(45) Date of Patent: Jan. 21, 2014

(54) SEALING ARRANGEMENT FOR USE IN A CABLE ENCLOSURE PORT

(75) Inventor: Matthew Badman, Plymouth (GB)

(73) Assignee: Hellermanntyton Limited (GB)

( * ) Notice: Subject to any disclaimer, the term of this patent is extended or adjusted under 35 U.S.C. 154(b) by 334 days.

(21) Appl. No.: 12/866,619

(22) PCT Filed: Feb. 9, 2009

(86) PCT No.: PCT/GB2009/000359
§ 371 (c)(1),
(2), (4) Date: Jan. 3, 2011

(87) PCT Pub. No.: WO2009/098488
PCT Pub. Date: Aug. 13, 2009

(65) Prior Publication Data
US 2011/0121520 A1    May 26, 2011

(30) Foreign Application Priority Data
Feb. 8, 2008   (GB) .................................. 0802385.5

(51) Int. Cl.
*H02G 15/013*       (2006.01)

(52) U.S. Cl.
USPC ........................................................ 174/77 R

(58) Field of Classification Search
USPC .......................... 174/77 R, 93, 654; 277/602
See application file for complete search history.

(56) References Cited

U.S. PATENT DOCUMENTS

| 3,288,407 A | 11/1966 | Downer et al. |
| 4,358,632 A * | 11/1982 | Buch ............................ 174/360 |
| 4,361,721 A | 11/1982 | Massey |
| 5,308,923 A | 5/1994 | Puigcerver et al. |
| 5,783,778 A * | 7/1998 | Foss et al. .................... 174/77 R |
| 6,409,179 B1 | 6/2002 | Daoud |
| 6,462,275 B1 * | 10/2002 | Daoud ........................... 174/654 |
| 6,521,840 B1 * | 2/2003 | Kreutz ........................... 174/151 |
| 2005/0248154 A1 * | 11/2005 | Huston .......................... 285/333 |
| 2007/0125515 A1 * | 6/2007 | Jung et al. ....................... 165/46 |

FOREIGN PATENT DOCUMENTS

| EP | 0505902 | 9/1992 |
| EP | 0514174 | 11/1992 |
| GB | 1594321 | 7/1981 |
| GB | 2298527 | 9/1996 |
| GB | 2391721 | 2/2004 |
| JP | 09166249 | 6/1997 |
| JP | 09271132 | 10/1997 |

* cited by examiner

*Primary Examiner* — Chau Nguyen
(74) *Attorney, Agent, or Firm* — Gordon & Jacobson, P.C.

(57) ABSTRACT

A cable enclosure sealing arrangement has a seal body with one or more cavities extending the full length of the sealing member and a slit extending from each cavity to the exterior of the sealing body such that the edges of each slit may be pulled apart to expose the cavity and permit insertion of a cable. The cavity may include a profiled interior surface having inclined or curved surface portions projecting into the cavity the inclination or curvature of the profiled surface portions being in opposite senses at opposite end zone sections of the cavity. The arrangement has a compression system for compressing the sealing member to effect sealing along the longitudinal slit. A tie rod extending through a central portion of the body and connecting two end plates can be used for this purpose.

14 Claims, 4 Drawing Sheets

- CONTINOUS UNBROKEN CABLE
- OUTER CABLE SHEATH
- INNER END PLATE (RIGID)
- HOUSING (RIGID)
- LOOP SEALING COMPRESSION GLAND (RUBBER)
- OUTER END PLATE (RIGID)
- CLAMPING BOLT

SEALING ARRANGEMENT FOR USE IN A CABLE ENCLOSURE PORT

BACKGROUND OF THE INVENTION

1. Field of the Invention

The present invention relates generally to sealing arrangement for use in the entry/exit ports of cable enclosures and, in particular, to sealing members configured to seal around looped cables as they pass though the entry/exit ports of cable enclosures.

2. State of the Art

Telecommunication cables are commonly used for the transmission of data across networks. Although some of these cables may be electrically conductive, fibre optic cables are generally preferred across large distances due to their enhanced bandwidth capabilities and their immunity to electromagnetic and radiomagnetic interference.

Networks are constructed from the conjunction of many cables. At various points along the network, a cable may be opened up (or 'spliced') so as to join it to another cable, perhaps to distribute data or power to a different location or new recipient. Thus, branches are commonly added to networks by splicing existing cables and making new connections.

At each branching point in the network, the spliced cable becomes exposed and is vulnerable to the ingress of moisture, dirt, insects or other environmental hazards. These hazards can degrade the performance of the cable, and thus some form of protection is required. It is common to use some type of enclosure to protect the cable(s) at these vulnerable points.

The prior art discloses known enclosures for electrical and optical fibre cables, including enclosures which permit the insertion of one or more cables and protect some form of cable connection (either a splice, a connector or other connection device). Such enclosures are also used to house surplus lengths of cable which may be stored for future use. It is common for such cables to be looped and subsequently stored inside such enclosures with a view to splicing the cable off so as to service new destinations or branches.

Typically, such cable enclosures feature one or more openings (known as 'ports') through which the cables can be fed for entry or exit purposes. Hereinafter, the phrase 'entry port', or simply the term 'port', may be taken to mean a port which permits the entry and/or exit of a cable or a plurality of cables. Unless appropriately sealed, such ports provide an entrance for environmental hazards such as moisture, dirt and insects and thus jeopardise the performance of the cable. Therefore, the port needs to be sealed with the use of a bung or grommet such that entry/exit of the cable(s) is still permitted while maintaining the integrity of the cable where exposed inside the enclosure.

A variety of enclosure seals are known in the prior art, including the use of heat shrink sleeving, self-vulcanising tapes, gels, potting compounds and so forth. One common type of seal is a pre-formed grommet which permits the passage of the cable(s) and is subsequently inserted into the port, forming an air/moisture tight blockade. However, the cable is usually inserted into the grommet by passing it though the body of the seal into a cavity via a slit made in the grommet wall. In order to prevent the ingress of environmental hazards, the split must be subsequently sealed. This is commonly achieved using the application of some type of mastic or gel tape installed under compression, but such an application is highly craft sensitive. If the application is performed incorrectly, the seal will degrade and the cable may become exposed to leakage and interference and, ultimately, degradation. The skill of the technician installing the grommet is therefore vital to the successful performance of the grommet.

Furthermore, the simultaneous or subsequent application of an additional sealing tape or compound requires the use of additional materials and tools, and lengthens the installation process considerably.

Further still, health and safety factors become relevant when applying heat shrink or resins to the seal, which would preferably be avoided.

Further still, it is not uncommon for optical fibres to break or become damaged during the installation process. However, the application of heat shrink, resin or tape makes it difficult to re-use the enclosure seal with an unspoilt cable in the event of such damage.

SUMMARY OF THE INVENTION

Thus it is an object of the present invention to provide a cable enclosure seal which permits the passage of one or more cables while reducing dependency upon the technician's skills and thus reducing the likelihood of installation errors.

It is a further object of the present invention to provide an enclosure seal which is quicker to install than prior art arrangements, reduces health and safety risks, and eliminates the need for additional, specialist tools or materials. This, in turn, reduces the expense associated with such installations.

In accordance with the present invention, there is provided a cable enclosure sealing arrangement comprising a sealing member having one or more elongate cavities extending the full length of the sealing member and a longitudinal slit extending from each cavity to the exterior of the sealing member such that the edges of each slit may be pulled apart to expose the cavity and permit insertion of a cable, wherein:

the cavity includes an interior surface having a serrated teeth profile, wherein the serrations include inclined surface portions the inclination of the teeth being in opposite senses at opposite end zone sections of the cavity; and/or, the arrangement comprises a compress arrangement for compressing the sealing member to effect sealing along the longitudinal slit.

As an alternative to serrated teeth having an inclined surface, other surface profiles maybe provided, such as for example curved surface formations, or other inclined, or castellated shapes. The inclination or curvature of the surface of the formation is preferably inclined, or curved in opposite senses at the opposite end zone sections of the cavity.

In a preferred embodiment, two elongate cable receiving cavities are arranged in side by side relationship in the sealing member, and a longitudinal slit extends from each cavity to the exterior of the sealing member such that the edges of each slit may be pulled apart to expose the cavity and permit insertion of a cable, the compress arrangement comprising end plates provided at opposed ends of the sealing member and an elongate tie element extending between the end plates and arranged to enable the endplates to be drawn toward one another, the elongate tie element extending through a bore in the sealing member positioned between the two elongate cable receiving cavities.

The provision of the two cavities in side by side relationship enables the arrangement to be used to seal an enclosure for a looped seal.

The provision of a single tie element (typically a threaded tie rod) positioned between the cavities enables the arrangement to be easily and securely energised and released. Accordingly, it is preferred that a sole elongate tie element is the only tie element extending between the end plates and arranged to enable the endplates to be drawn toward one another.

Beneficially, the or both endplates include respective slots for accommodating a respective length of cable present in a respective cavity, the slots extending to a mouth portion at a side of the endplate. This enables the endplate to be positioned conveniently to accommodate the cable lengths. This is enhanced by means of ensuring that, for a respective endplate a first slot is provided with a mouth portion at one side of the endplate, and a second slot is provided with a mouth portion at a second side of the endplate (opposite to the first side). The endplate can therefore be rotated into position accommodating the cable lengths.

The sealing member is beneficially made from a flexible and/or compressible material, such as rubber, so as to facilitate the widening of the slit(s) during insertion of the cable(s) and compression of the sealing member around the enclosed cable(s).

The compress arrangement preferably acts in the longitudinal direction of the cavity to compress the sealing member.

In one embodiment, the compress arrangement preferably comprises actuator elements at either end of the sealing member which are drawn toward one another to compress the sealing member. The actuator elements may comprise end plates for the sealing member and may be of plastics or metallic materials.

In such an embodiment, the actuator elements may be drawn together by tightening of a screw tie element such as screw threaded tie element, such as a bolt, passing through both actuator elements. The tie element may extend through a bore in the sealing member.

In a preferred embodiment one or both end plates may include an upstanding lip arrange to encompass a respective end of the sealing member. It is preferred that one or both endplates includes one or more slots, extending to the edge of the plate, for accommodating the cable.

It is preferred that the interior cavity surface is profiled, such that in sectional view the surface profile at one end is a mirror image of the surface profile at the opposed end.

As defined, one zone of the teeth are oriented towards one end of the cavity while the remaining teeth are oriented towards the opposing end. Preferably, the number of teeth oriented in each direction is exactly or approximately half the total number of teeth and each half is oriented away from the closest end of the sealing member. This is in order to maximise the cable axial tension (pull-out resistance) on the most compressed area of the seal.

Beneficially the profile of the teeth is feathered to reduce to a minimum at the edge of the slit. Preferably, the height of the teeth reduces smoothly and uniformly towards the edges of the slits. This feathering effect ensures that when the slit edges are compressed together the seal is smooth and continuous, without any castellations, ridges or notches which might otherwise compromise the integrity of the seal.

In one embodiment the sealing arrangement includes a pair of elongate cable receiving cavities are arranged in side by side relationship in the sealing member.

Preferably, each cavity is generally cylindrical in profile so as to conform to the profile of the enclosed cable, thus providing a tight seal around the enclosed cable. These and other aspects of the present invention will be apparent from, and elucidated with reference to, the embodiment described herein.

An embodiment of the present invention will now be described by way of example only and with reference to the accompanying drawings.

DETAILED DESCRIPTION OF THE PREFERRED EMBODIMENT

Figure 1:
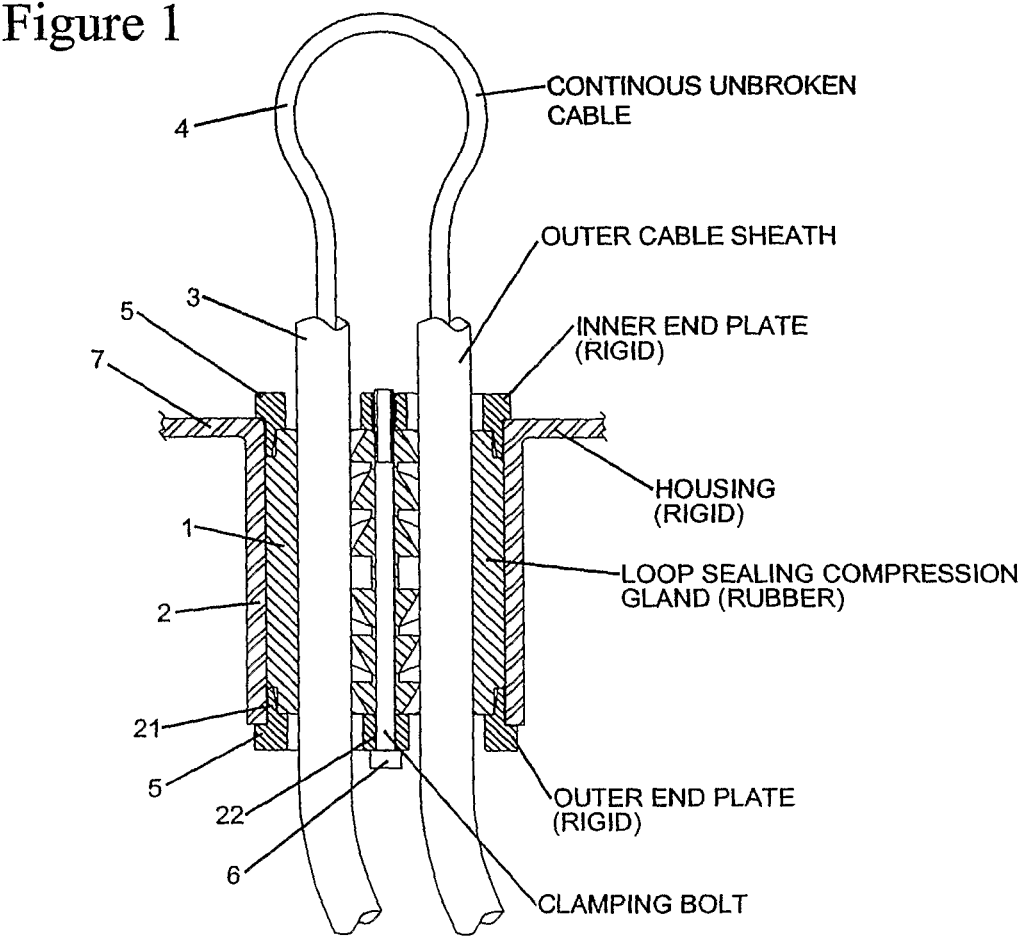
FIG. 1 is a schematic sectional view of a sealing arrangement installed within a cable enclosure.
Figure 2:
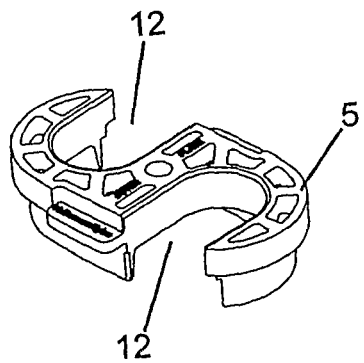
FIG. 2 is a view of an end plate comprising the arrangement shown in FIG. 1.
Figure 3:
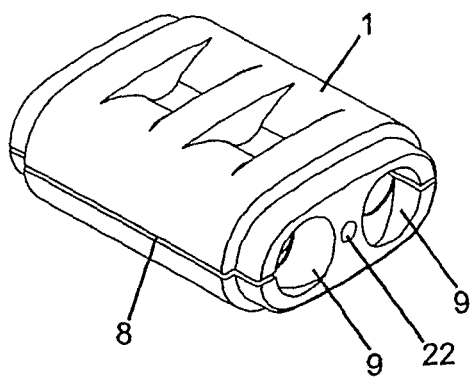
FIG. 3 is a schematic perspective view of a sealing member comprising the arrangement of FIG. 1.
Figure 4:
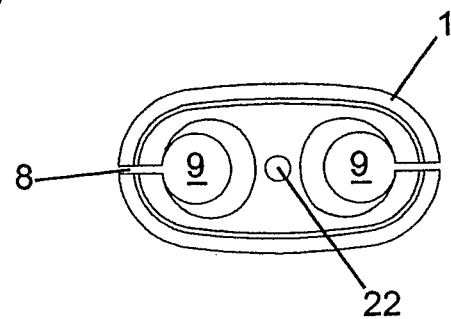
FIG. 4 is an end view of the sealing member of FIG. 3.
Figure 5:
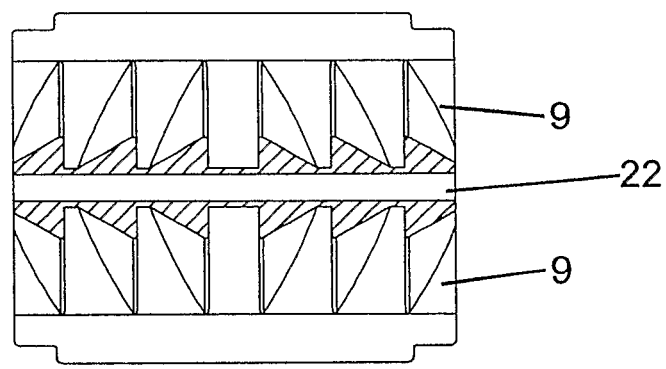
FIG. 5 is a side cut away view of the sealing member of FIGS. 3 and 4.
Figure 6:
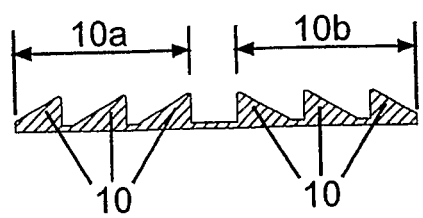
FIG. 6 is a sectional view along a length of one of the cavities of the sealing member showing the serrated teeth.
Figure 7:
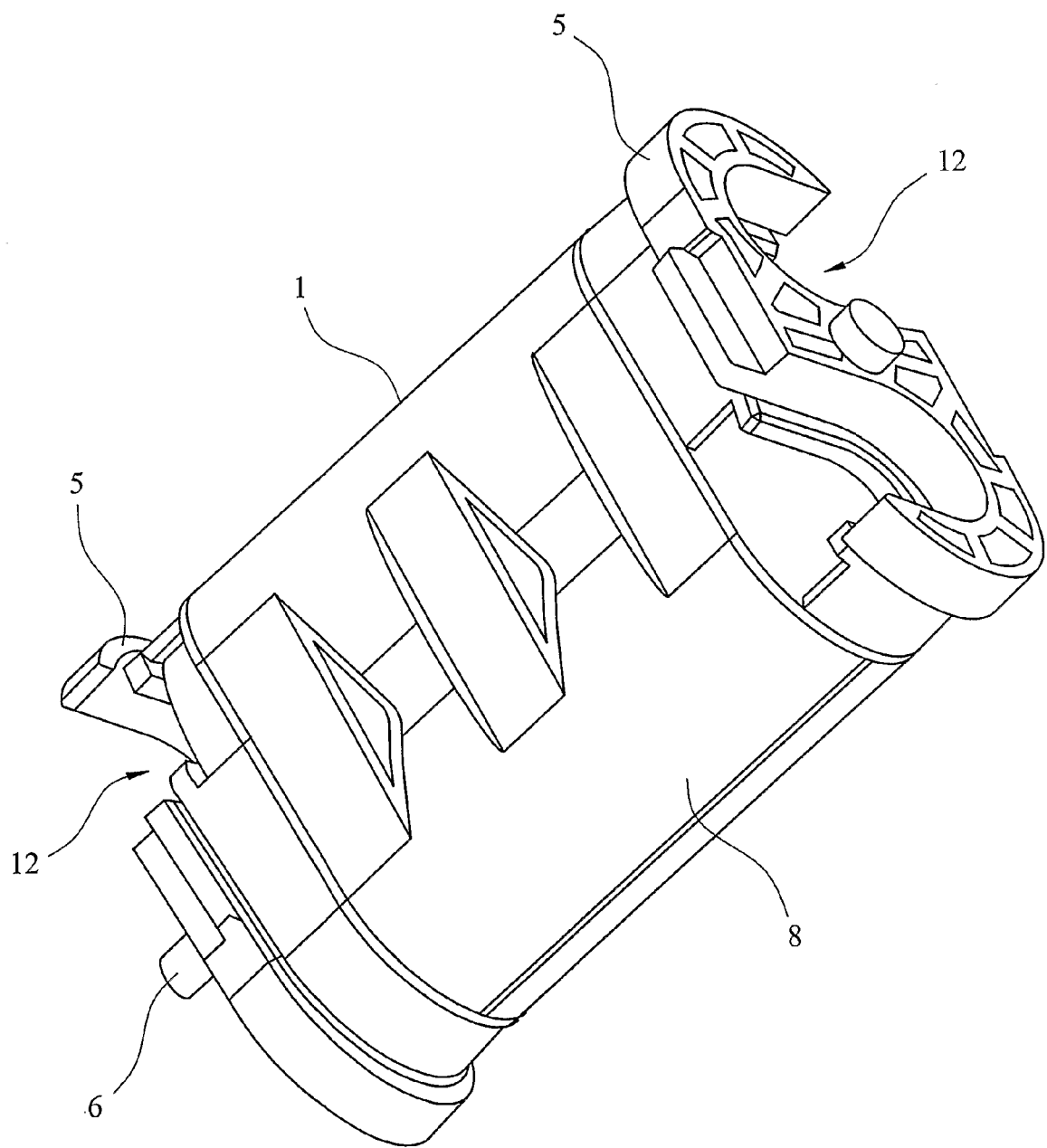
FIG. 7 is a schematic perspective view of the sealing arrangement of the invention.
Figure 8:
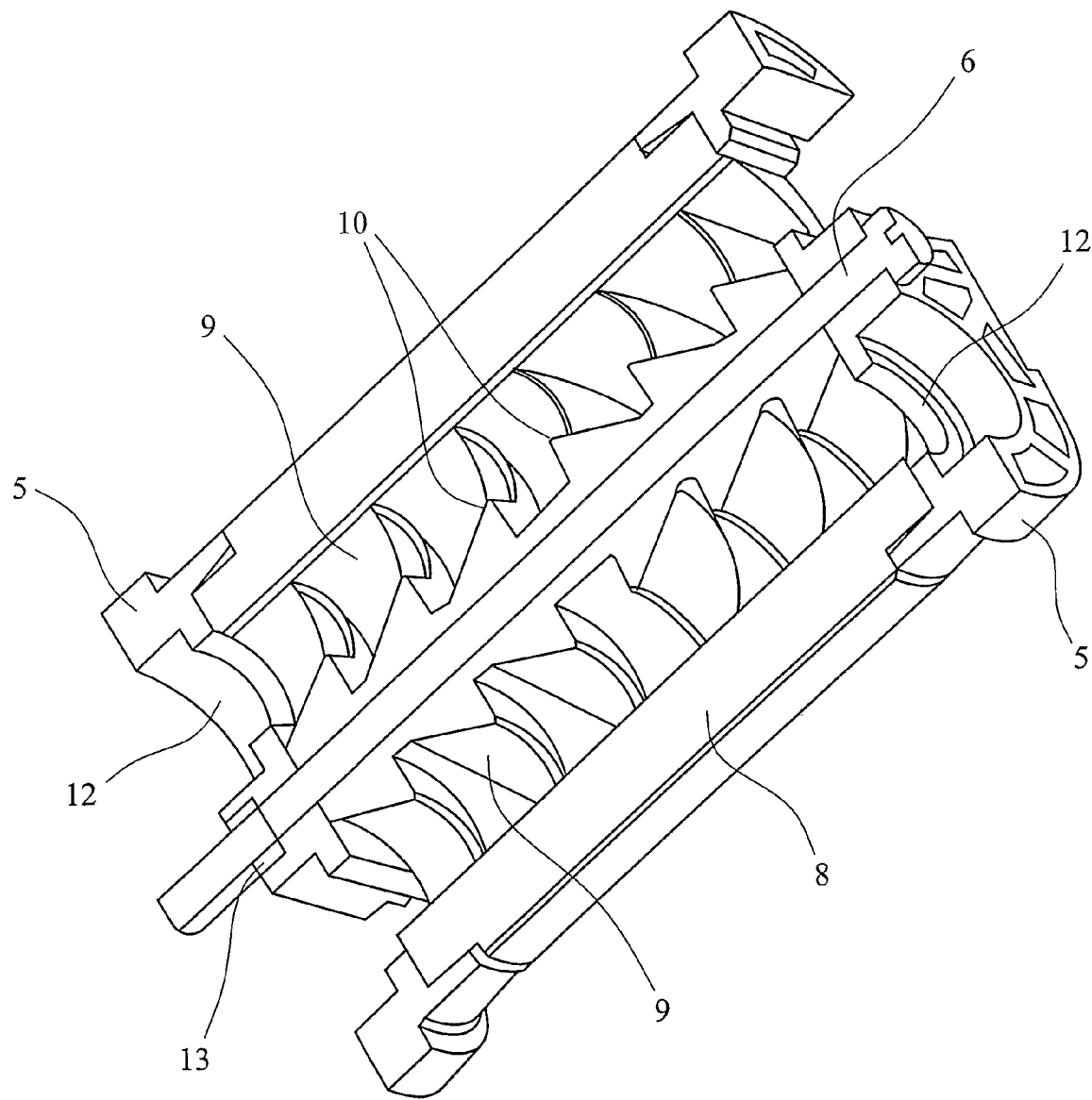
FIG. 8 is a schematic perspective section view along the longitudinal split in the sealing member.

Referring to FIG. 1 of the drawings, a looped cable 3 is enclosed in a sealing member 1 which is inserted into an entry port 2 in a telecommunications cable enclosure 7.

The cable 3 is prepared by stripping the outer cable sheath (or 'jacket') 4 in its mid span such that the cable can be easily bent into a looped configuration and the bent portion inserted though a port 2 in the enclosure 7. Thus, two lengths of the cable protrude from the enclosure 7 as illustrated in FIG. 1.

The cable is inserted into the sealing member 1. This is achieved by pulling apart the edges of the slits 8 which extend along the longitudinal edges of the sealing member 1, to reveal generally cylindrical bores or cavities 9 which extend the length of the sealing member 1, and pushing the cable lengths into said cavities 9.

When the edges of the slits 8 are released, the edges move back towards one another and the cable lengths are enclosed within the cavities 9. Flexible serrated teeth 10 formed within the cavities 9 grip against the outer jacket of the cable 3.

The sealing member 1 (and thus the enclosed cable 3) is pushed into the port 2 of the enclosure 7.

A rigid end plate 5 is fitted to each end of the sealing member 1, such that one end cap 5 is positioned inside the enclosure 7 and one is positioned outside the enclosure. The end caps include an upstanding peripheral lip 21 for receiving the respective end of the sealing member 3 and for secure location within the port 2. The end plates are provided with slots 12 extending to mouth portions at the edge of the end plate for accommodating the cable lengths 3. Apertures could not be used because the cable lengths 3 are already positioned in the sealing member 1. This arrangement enables the endplate to be positioned conveniently to accommodate the cable lengths. This is enhanced by means of ensuring that, for a respective endplate a first slot 12 is provided with a mouth portion at one edge of the endplate, and a second slot 12 is provided with a mouth portion at a second edge of the endplate (opposite to the first edge). The end plate can therefore be rotated into position accommodating the cable lengths.

A clamping/tie bolt 6 (having a screw thread end) is passed through one of the end caps, through the body of the sealing member 1 via a bore 22 and finally through the opposing end plate 5. A threaded insert 13 is located within a recess in the inner end plate 5 and cooperates with the threaded end of the tie bolt 6 to secure and energise the end plates 5 in their clamping position. The tie bolt is positioned between the cavities 9. The provision of a single tie bolt positioned centrally of the body, between the cavities 9 enables the arrangement to be easily and securely energised and released. Accordingly, it is preferred that a sole elongate tie bolt 6 is the only tie between the end plates and arranged to enable the endplates to be drawn toward one another.

As the clamping/tie bolt 6 is tightened, the end plates 5 are drawn longitudinally inwards towards one another, thus compressing the sealing member 1. As the rigid sides of the enclosure port 2 prevent any outward movement, the edges of the slits 8 are forced inwards towards each other so as to close the slits 8 and form a tight seal. The plates 5 therefore act as actuators of a compress means (in combination with the tightening bolt 6 and threaded insert 13 to seal the edges of the slits 8.

The cavities 9 include an interior surface having a serrated teeth 10 profile, wherein the serrations include inclined surface portions. Importantly the inclination of the teeth 10 is in the opposite sense at opposite end zone sections 10a, 10b of the respective cavity. Furthermore, the profile of the teeth 10 is feathered (reduces smoothly and uniformly towards the edges of the slits) so as to reduce to a minimum at the edge of the slits and blend with the edges of the slits 8. The seal is formed as smoothly and tightly as possible without any ridges or notches causing a hindrance which might otherwise compromise the integrity of the seal.

In addition, after installation the teeth 10 engage with the cable jacket 4 and as each half of the teeth 10 are oriented away from the closest end of the sealing member 1, pressure is always exerted in counteraction to any pulling or pushing of the cable while in situ, regardless of which way round the sealing member 1 is inserted. The bi-directional, mirror image, orientation of the teeth ensures that, if there is an attempt to pull the cable out of the enclosure, maximum resistance is always applied at the external face of the port where it is needed to prevent displacement of the cable. This resistance is generated irrespective of the sealing member's orientation upon insertion into the port, and vitiates the notion of a 'right way round' or 'wrong way round'. Either end of the member may be inserted into the port during installation without a detrimental effect upon performance. Thus, installation speed, errors and cost are all kept to a minimum.

It should be noted that the above description relates to an embodiment configured to seal around a looped cable. However, a person skilled in the art will be aware that other embodiments may be configured to seal around non-looped cable(s). Therefore, it is emphasised that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A cable sealing apparatus, comprising:
   a sealing member and end plates that interface to opposed ends of the sealing member,
   wherein said sealing member defines a first elongate cavity extending along a full length of the sealing member and a first longitudinal slit extending through said sealing member to said first elongate cavity for allowing passage of a first length of cable through said first slit into said first elongate cavity,
   wherein said sealing member includes first edges which define a portion of said first longitudinal slit, said first edges being separable to widen said first slit to expose said first cavity and permit insertion of said first length of said cable into said first cavity,
   wherein said sealing member further defines a second elongate cavity spaced from said first elongate cavity and extending along the full length of the sealing member, and a second longitudinal slit extending through said sealing member to said second elongate cavity for allowing passage of a second length of cable into said second elongate cavity, said sealing member including second edges which define a portion of said second longitudinal slit, said second edges being separable to widen said second slit to expose the second cavity and permit insertion of said second length of said cable into said second cavity, and
   wherein an elongate tie element extends between the end plates through a bore in the sealing member, the tie element configured to draw the end plates toward one another to compress the first edges of said sealing member to effect sealing along the first longitudinal slit and to compress the second edges of said sealing member to effect sealing along the second longitudinal slit.

2. A cable sealing apparatus according to claim 1, wherein: the elongate tie element is the only tie element extending between the end plates.

3. A cable sealing apparatus according to claim 1, wherein: at least one of the end plates defines an aperture for receiving the tie element.

4. A cable sealing apparatus according to claim 1, wherein: at least one of said end plates includes slots for receiving said first and second lengths of said cable, each slot extending to a mouth portion at an opposite side of the end plate.

5. A cable sealing apparatus according to claim 4, wherein: said slots include a first slot extending to a first mouth portion at a first side of the end plate, and a second slot extending to a second mouth portion at a second side of the end plate opposite said first side.

6. A cable sealing apparatus according to claim 1, wherein: said sealing member includes an interior surface having inclined or curved surface portions projecting into the first cavity, the surface portions projecting in different directions at opposite end sections of the first cavity.

7. A cable sealing apparatus according to claim 1, wherein: the sealing member is made from at least one of a flexible and compressible material.

8. A cable sealing apparatus according to claim 1, wherein: the end plates and elongate tie element are configured to compress the sealing member in a longitudinal direction.

9. A cable sealing apparatus according to claim 1, wherein: said elongate tie element includes a bolt and a screw, said bolt passing through both of said end plates, said screw operable to move the end plates actuator elements toward one another.

10. A cable sealing apparatus according to claim 1, wherein:
    at least one of said end plates includes a lip which couples to a respective end of the sealing member.

11. A cable sealing apparatus according to claim 1, wherein:

at least one of said end plates includes a slot for receiving the cable.

12. A cable sealing apparatus according to claim 1, wherein:
said first cavity includes an interior surface having surface projections which project into said first cavity, said surface projections projecting in different directions at opposite end sections of said first cavity.

13. A cable sealing apparatus according to claim 12, wherein:
said surface projections are feathered to reduce to a minimum at said first edges that define said first slit.

14. A cable sealing apparatus comprising:
a sealing member defining a first elongate cavity and a second elongate cavity;
wherein the first elongate cavity extends along a full length of the sealing member and a first longitudinal slit extends through said sealing member to said first elongate cavity for allowing passage of a first length of cable through said first slit into said first elongate cavity, wherein said sealing member includes first edges which define a portion of said first longitudinal slit, said first edges being separable to widen said first slit to expose said first cavity and permit insertion of said first length of cable into said first cavity;
wherein the first cavity includes a profiled interior surface having inclined or curved surface portions projecting into the first cavity and configured to define a seal interface to said first length of cable inserted into said first cavity, the surface portions projecting in different directions at opposite end sections of the first cavity;
wherein the second elongate cavity is spaced from said first elongate cavity and extends along the full length of the sealing member and a second longitudinal slit extends through said sealing member to said second elongate cavity for allowing passage of a second length of said cable into said second elongate cavity, wherein said sealing member includes second edges which define a portion of said second longitudinal slit, said second edges being separable to widen said second slit to expose said second cavity and permit insertion of said second length of cable into said second cavity;
wherein the second cavity includes a profiled interior surface having inclined or curved surface portions projecting into the second cavity and configured to define a seal interface to said second length of cable inserted into said second cavity, the inclination or curvature of the profiled surface portions projecting in different directions being in opposite senses at opposite end zone sections of the second cavity;
wherein the apparatus further comprises means for compressing the first edges of said sealing member to effect sealing along the first longitudinal slit;
wherein the apparatus further comprises means for compressing the second edges of said sealing member to effect sealing along the second longitudinal slit; and
wherein the means for compressing the first edges of the sealing member and the means for compressing the second edges of the sealing member comprises end plates that interface to opposed ends of the sealing member and an elongate tie element that extends between the end plates through a bore in the sealing member, wherein the tie element is configured to draw the end plates toward one another.

* * * * *